(12) United States Patent
Herding et al.

(10) Patent No.: US 12,533,616 B2
(45) Date of Patent: *Jan. 27, 2026

(54) METHOD FOR THE DRY FILTRATION OF A GAS FLOW CARRYING FOREIGN OBJECTS, AND FILTER DEVICE FOR CLEANING RAW GAS CARRYING FOREIGN OBJECTS

(71) Applicant: HERDING GMBH FILTERTECHNIK, Amberg (DE)

(72) Inventors: Walter Herding, Hahnbach (DE); Urs Herding, Amberg (DE); Sebastian Dandorfer, Amberg (DE); Stefan Hajek, Amberg (DE); Dino Bethke, Königstein (DE); Klaus Rabenstein, Edelsfeld (DE); Maximilian Rösch, Etzenricht (DE); Thomas Sehr, Schnaittenbach (DE); Franz Weiss, Hohenburg (DE)

(73) Assignee: Herding GmbH Filtertechnik (DE)

( * ) Notice: Subject to any disclaimer, the term of this patent is extended or adjusted under 35 U.S.C. 154(b) by 655 days.

This patent is subject to a terminal disclaimer.

(21) Appl. No.: 17/796,095

(22) PCT Filed: Jan. 14, 2021

(86) PCT No.: PCT/EP2021/050701
§ 371 (c)(1),
(2) Date: Jul. 28, 2022

(87) PCT Pub. No.: WO2021/151680
PCT Pub. Date: Aug. 5, 2021

(65) Prior Publication Data
US 2023/0330581 A1    Oct. 19, 2023

(30) Foreign Application Priority Data

Jan. 28, 2020 (DE) .......................... 102020102036.8
Feb. 14, 2020 (DE) .......................... 102020103982.4
May 12, 2020 (DE) .......................... 102020112861.4

(51) Int. Cl.
*B01D 46/00* (2022.01)
*B01D 46/42* (2006.01)
(Continued)

(52) U.S. Cl.
CPC ..... *B01D 46/0093* (2013.01); *B01D 46/4263* (2013.01); *B01D 46/48* (2013.01);
(Continued)

(58) Field of Classification Search
CPC .... B01D 46/0093; B01D 46/71; B01D 46/84; B01D 2273/12; B33Y 40/00
See application file for complete search history.

(56) References Cited

U.S. PATENT DOCUMENTS 4,080,431 A * 3/1978 Moss ..................... C01B 21/064
423/440
5,527,019 A * 6/1996 Schwarz ............ B01D 46/0093
266/135
(Continued)

FOREIGN PATENT DOCUMENTS

DE         4130640 A1     3/2012
DE    102017207415 A1    11/2018
(Continued)

OTHER PUBLICATIONS

EP Office Action for corresponding EP Application No. 21702369.6 dated Sep. 22, 2025.

Primary Examiner — Robert Clemente
(74) Attorney, Agent, or Firm — Bachman & LaPointe, P.C.

(57) ABSTRACT

A method and a filter device for the dry filtration of a gas flow carrying foreign objects in a filter device for purifying waste gas produced in additive manufacturing technologies,
(Continued)

conducting a raw gas flow containing foreign objects into a raw gas space of a filter unit having at least one filter surface separating a raw gas side from a clean gas side, feeding oxidant to a reaction region located on the raw gas side of the filter surface downstream of the filter surface, such that foreign objects contained in material cleaned off from the filter surface and/or in the raw gas flow react with the oxidant in the reaction region to form foreign objects containing oxides.

20 Claims, 4 Drawing Sheets

(51) Int. Cl.
| | |
|---|---|
| *B01D 46/48* | (2006.01) |
| *B01D 46/71* | (2022.01) |
| *B01D 46/84* | (2022.01) |
| *B22F 12/70* | (2021.01) |
| *B33Y 40/00* | (2020.01) |

(52) U.S. Cl.
CPC ............ *B01D 46/71* (2022.01); *B01D 46/84* (2022.01); *B22F 12/70* (2021.01); *B33Y 40/00* (2014.12); *B01D 2251/10* (2013.01); *B01D 2258/02* (2013.01); *B01D 2273/12* (2013.01); *B01D 2273/20* (2013.01); *B22F 2999/00* (2013.01)

(56) References Cited

U.S. PATENT DOCUMENTS

| | | | | |
|---|---|---|---|---|
| 7,972,399 B2 * | 7/2011 | Ahman | ................. | B01D 46/48 |
| | | | | 95/286 |
| 2013/0259758 A1 * | 10/2013 | Herding | ................. | B01D 46/38 |
| | | | | 55/303 |

FOREIGN PATENT DOCUMENTS

| | | | | |
|---|---|---|---|---|
| EP | 3248666 | A2 * | 11/2017 | ............ B01D 46/00 |
| KR | 100375566 | B1 * | 11/2001 | |
| WO | 2012032003 | A1 | 3/2012 | |
| WO | 2020017952 | A1 | 1/2020 | |
| WO | 20210151938 | A1 | 8/2021 | |

* cited by examiner

METHOD FOR THE DRY FILTRATION OF A GAS FLOW CARRYING FOREIGN OBJECTS, AND FILTER DEVICE FOR CLEANING RAW GAS CARRYING FOREIGN OBJECTS

BACKGROUND

The invention relates to a method for the dry filtration of a gas flow carrying foreign objects, and to a filter device for cleaning raw gas carrying foreign objects.

When purifying gases carrying highly flammable foreign bodies or objects, such as occur in systems for additive manufacturing of workpieces made of metal (e.g. in laser sintering of workpieces made of titanium or aluminum alloys), there is a danger of uncontrolled fires in the waste gas. This danger is particularly great when such highly flammable foreign objects are deposited on filter surfaces and accumulate in the process. Attempts have been made to counter these dangers by precoating the filter surfaces with inerting filtration aids such as $CaCo_3$ or adding such aids to the raw gas to be purified, similar to the design shown in WO 2012/032003 A1.

SUMMARY

It is an object of the invention to prevent or suppress raw gas fires when filtering raw gases containing flammable foreign objects, such as in particular when filtering waste gases produced in additive manufacturing technologies, by means of a dry filter.

In the method for the dry filtration of a gas flow carrying foreign objects, according to the invention, in particular in a filter device for cleaning off exhaust air or waste gas produced in additive manufacturing technologies, a raw gas flow containing foreign objects is fed into a raw gas space of a filter unit which has at least one filter surface separating a raw gas side from a clean gas side. Furthermore, an oxidant is fed to a reaction region located on the raw gas side of the filter surface downstream of the filter surface. The oxidant is fed such that foreign objects contained in material cleaned-off from the filter surface and/or in the raw gas flow react with the oxidant in the reaction region to form oxide-containing foreign objects.

The present invention proposes a method and provides a correspondingly designed filter device in which spontaneous oxidation of reactive or even highly reactive foreign objects in waste gases, such as metal-containing particles in the waste gas from additive manufacturing equipment such as laser sintering devices, is specifically brought about. The high reactivity of such foreign objects with oxidants such as oxygen or air—actually the reason why dry filtration of such waste gases is problematic—is thereby specifically exploited to trigger a spontaneous reaction of the foreign objects with oxidant. Surprisingly, it is possible to specifically initiate this spontaneous reaction by appropriate control of the supply and/or discharge of oxidant and, if necessary, other measures, and to keep its course well under control, so that an uncontrolled reaction of the foreign objects with the oxidant can be avoided. With the procedure proposed herein, the heat generated during the reaction can be well dissipated, so that there is no need to fear uncontrollable fires or explosions.

A basic idea of the present invention is not to render inert readily combustible foreign objects contained in the raw gas, but rather to render them harmless by purposefully initiating and carrying out a controlled transfer of these combustible foreign objects into an oxidized configuration (i.e. by chemical reaction). In the oxidized configuration, these foreign objects are generally poorly reactive or inert and no longer combustible, so that further handling of these oxidized foreign objects no longer requires any special precautions.

However, care must be taken to ensure that the spontaneous oxidation reaction proceeds in a controlled manner. This can be achieved by suitable supply of oxidant to a predetermined reaction region containing material cleaned off from the filter surface and thus containing foreign objects, and/or by further measures to remove oxidant from the reaction region. It has been found that the course of the usually strongly exothermic oxidation reaction can be well controlled if the oxidant is not only supplied to the reaction region, but rather flows through the reaction region. The oxidant is then supplied to the reaction region at a first location or in a first region (inlet) and flows through the reaction region until it leaves the reaction region again at a further location or a further region (outlet), in any case provided it has not been consumed by reaction with material containing foreign objects while flowing through the reaction region. In this way, it is possible to specifically provide an excess of oxidant in the reaction region, as it is necessary to spontaneously initiate the desired reaction for the formation of oxide-containing foreign objects or to maintain the same to a controlled extent. The flow of oxidant flowing through the reaction region allows precise control of the course of the oxidation reaction. The latter proceeds spontaneously but in a controlled manner as soon as the oxidant flow starts, and can be well controlled by adjusting the strength of the oxidant flow, and possibly also by adjusting the composition of the oxidant flow.

In the case of spontaneous oxidation, the desired reaction(s) to form oxide-containing foreign objects occurs essentially without the provision of activation energy by the supply of energy from an energy source, such as an ignition source or a heat source. Oxidation may already be initiated by oxidant coming into contact with material present in or entering the reaction region that falls off the filter surface during cleaning off.

The oxidant may be air or an oxygen-containing gas. Other substances, for example, inert gases such as nitrogen or noble gases, may be mixed with the oxidant to form an oxidant flow. For example, air can be used to form the oxidant flow, or an oxygen-depleted mixture with an oxygen content of 5 to 21 percent by volume. The oxidant or concentration of oxidant in the oxidant flow is selected sufficiently high to allow spontaneous reaction of foreign objects-containing material in the reaction region to form oxide-containing foreign objects.

The wording "downstream of the filter surface on the raw gas side of the filter surface" is intended to express that the reaction region is downstream of the raw gas space with respect to the transport of foreign objects that have accumulated on the filter surface and have been cleaned off from the filter surface during a cleaning-off cycle (for example, by applying a pressure pulse to the filter surface). Material cleaned off from the filter surface is thus conveyed to the reaction region. In particular, the reaction region is to be separate from the raw gas space, in particular downstream of the raw gas space. If the oxidant is first supplied to the downstream reaction region, but not to the raw gas space or an area upstream of the raw gas space, these areas remain free of oxidant, so that the oxidation treatment of the cleaned-off foreign objects-containing material does not affect the process environment, in which the actual filtering of raw gas takes place, by introducing oxidant. In particular, the filtering process or the working process in which the waste gas to be filtered is produced can take place under largely inert conditions and is not disturbed by the oxidation treatment. The maintenance of an inert environment in the raw gas space can additionally be ensured by temporarily separating the reaction region from the raw gas space when oxidant is supplied, in particular by separating it in a gas-tight manner.

As explained, it is favorable if, when material cleaned off from the filter surface reacts with the oxidant, oxidant that has not been consumed is actively removed from the reaction region. In this way, a suitable surplus of oxidant can be provided and thus a controlled course of the oxidation reaction can be achieved. This means that the aim is not necessarily to remove only reaction products, in particular oxide-containing foreign objects formed during the reaction and, where applicable, unconverted or incompletely converted cleaned-off material, from the reaction region after more or less complete chemical conversion has taken place. Rather, any oxidant not consumed in the reaction should be removed during the course of the oxidation reaction, usually to the same extent as new oxidant is added. In this way, the oxidation reaction in the reaction region can proceed essentially under constant ambient conditions, in particular under a constant concentration of oxidant.

As soon as a sufficient proportion of foreign objects-containing material has been converted to oxide-containing foreign objects in the reaction region, or at least in a partial region belonging to the reaction region, and/or a sufficiently large amount of foreign objects-containing material has been removed from the reaction region, or at least from a partial region belonging to the reaction region, it can be provided that the oxidation reaction is stopped, at least in the partial region belonging to the reaction region. In this case, the supply of further oxidant to the reaction region or to the partial region belonging to the reaction region is stopped. Reaction products or reaction residues are then generally removed from the reaction region or the partial region belonging to the reaction region. It will often be provided that substantially all reaction products or reaction residues are removed from the reaction region or the partial region belonging to the reaction region. It may also be sufficient to remove only a portion of the reaction products or reaction residues. The reaction products or reaction residues remaining in the reaction region or the partial region belonging to the reaction region can subsequently be subjected to further oxidation together with new material entering the reaction region or the partial region belonging to the reaction region, if necessary after addition of further oxidant. After removal of the oxidant still remaining in the reaction region or the partial region belonging to the reaction region after the reaction has been stopped or has taken place, the reaction region or the partial region belonging to the reaction region can be brought into fluid communication with the raw gas space without the risk of oxidant entering the raw gas space.

In particular, the oxidant can be sucked off or withdrawn from the reaction region or the partial region belonging to the reaction region. For this purpose, the reaction region can be subjected to a negative pressure in order to suck off oxidant still present in the reaction region from the reaction region. Reaction products and/or other reaction residues can also be sucked off from the reaction region by applying negative pressure to the reaction region. The application of negative pressure to the reaction region may occur during and/or following the reaction of material cleaned off from the filter surface with the oxidant.

An oxidant inlet may be provided for supplying oxidant to the reaction region or to the partial region belonging to the reaction region. An oxidant outlet may be provided for removing oxidant from the reaction region or from the partial region belonging to the reaction region. In the simplest case, the oxidant inlet can also serve as an oxidant outlet at the same time. As a rule, however, it will be provided that the oxidant outlet is different from the oxidant inlet, in particular such that an oxidant flow is formed between the oxidant inlet and the oxidant outlet, which flow traverses as large a part as possible of the reaction region or the partial region belonging to the reaction region.

The oxidant outlet may be an outlet specifically provided for discharging gas, in particular oxidant. However, it is also possible that oxidant that has not been consumed is discharged through the same oxidant outlet as oxide-containing foreign objects that have been formed during the reaction and, if applicable, cleaned-off material that has not yet been reacted. In this case, the oxidant outlet is designed to discharge both gaseous material and material containing solids.

It is conceivable, but not cogently necessary, that all of the reaction of foreign objects-containing material with oxidant occurs in an area upstream of the oxidant outlet. Oxidant or a mixture of oxidant and further (e.g. inert) fluid discharged through the oxidant outlet is then not used for further oxidation, apart from a possible recirculation of the oxidant flow to the oxidant inlet. However, it is also conceivable that the reaction region comprises areas located downstream of the oxidant outlet, in particular conduits or lines, conveying means and/or containers located downstream of the oxidant outlet. This will be particularly worth considering if unconsumed oxidant is discharged through the same oxidant outlet as oxide-containing foreign objects formed during the reaction and foreign objects that possibly have not yet been converted or reacted.

In one possible embodiment, the oxidant outlet may be connected to a pneumatic conveying means. In particular, this pneumatic conveying means may be a conveying means operating as a solids injector or jet pump. Alternatively, a suction blower would be conceivable. The pneumatic conveying means may be connected to the oxidant outlet with a conveying connection and thus exert a suction effect on the reaction region or the partial region of the reaction region. The suction effect causes oxidant or a mixture of oxidant and other (e.g. inert) fluid introduced into the reaction region or the partial region of the reaction region to flow as an oxidant flow toward the oxidant outlet, thereby passing through the reaction region or the partial region of the reaction region and causing the oxidant to react with foreign objects-containing material to form oxide-containing foreign objects.

Oxide-containing foreign objects formed during the reaction and foreign objects that possibly have not yet been reacted can also be discharged via a pneumatic conveying means, in particular a conveying means operating as a solids injector or jet pump. The pneumatic conveying means can also serve to transport such solids-containing material further, for example through lines to a collecting container or disposal container. The conveyed solids-containing material may contain oxide-containing foreign objects resulting from the reaction with oxidant, or cleaned-off material that has not yet been reacted. This pneumatic conveying means may be provided specifically for removing solids-containing material from the reaction region or the partial region of the reaction region. However, it is also conceivable that the pneumatic conveying means is provided both for withdrawing solids-containing material from the reaction region or the partial region of the reaction region and for withdrawing gaseous material from the reaction region or the partial region of the reaction region and/or for adding oxidant to the conveyed solids-containing material. For example, in a solids injector, an oxidant-containing fluid such as air or an oxygen-containing gas mixture can be used as the conveying fluid. In this way, the mixing of the conveying fluid and the conveyed solids-containing material causes the desired oxidation reaction to occur efficiently when the mixture is transported through downstream portions of the solids injector of the conveying line.

By controlling the pneumatic conveying means, it is possible to adjust the suction strength acting on material in the reaction region or in the partial region of the reaction region. At lower suction strength, (at least substantially) only gaseous material is withdrawn from the reaction region or the partial region of the reaction region, so that the opening (suction opening) connected to the conveying connection of the pneumatic conveying means forms an oxidant outlet. In the case of stronger suction strength, both solid-containing material and gaseous material are withdrawn from the reaction region or from the partial area of the reaction region. In this case, the suction opening forms an outlet for further transport of solids-containing material in the reaction region or in the partial region of the reaction region and, at the same time, an oxidant outlet and/or arrangement for supplying oxidant to the solids-containing material transported further. The latter, for example, by mixing oxidant-containing conveying fluid and solids-containing material in a solids injector.

The reaction region or the partial region of the reaction region furthermore can be acted upon by an inert fluid, in particular inert gas. By admixing an inert gas, for example, the concentration of oxidant in the oxidant flow can be suitably adjusted and, if necessary, the course of the oxidation reaction can be accelerated or slowed down. Acting on the reaction region or the partial region of the reaction region with an inert fluid without oxidant can serve, for example, to stop the further course of the reaction of cleaned-off material with oxidant in the reaction region or in the partial region of the reaction region. The inert fluid may also serve to drive out any remaining oxidant in the reaction region or partial region of the reaction region to create a sufficiently inert atmosphere in the reaction region or partial region of the reaction region to allow fluid contact to be made between the reaction region or partial region of the reaction region and the raw gas space. Stopping the reaction can be provided, for example, after a certain amount of cleaned-off material has been reacted with oxidant or after a certain proportion of cleaned-off material has been reacted with oxidant.

For example, it may be provided that the reaction of material cleaned off from the filter surface with the oxidant proceeds in reaction phases, wherein an application of oxidant to the reaction region or the partial region of the reaction region takes place during the respective reaction phases and, following a respective reaction phase, the reaction region or the partial region of the reaction region is acted upon with inert fluid without addition of oxidant. In this way, the course of the reaction can be managed in very controlled manner, because the reaction will come to a standstill after the supply of oxidant is switched off, and then any material in the reaction region or in the partial region of the reaction region, whether solid or gaseous, can be completely or partially removed from the reaction region or from the partial region of the reaction region. By flushing the reaction region or the partial region of the reaction region at the same time with inert fluid, the concentration of oxidant can then be reduced to such an extent that fluid contact between the reaction region or the partial region of the reaction region and the raw gas space is possible again without the risk of oxidant entering into the raw gas space. The reaction region or partial region of the reaction region is then ready to receive another batch of material cleaned off from the filter surface.

Introducing inert gas into the reaction region or the partial region of the reaction region can be accomplished in simple manner, for example, via a purge port of a solids injector to which inert fluid is fed.

In support of the measures described, it can be provided that inert fluid is fed into the reaction region or into the partial region of the reaction region via a further fluid inlet that is different from the oxidant inlet. For example, such a further fluid inlet may be provided in the vicinity of an opening connecting the reaction region or the partial region of the reaction region with the raw gas space in order to selectively flush out oxidant from a vicinity of this opening. It is also conceivable to provide a plurality of such further fluid inlets.

It may also be convenient when inert fluid and/or oxidant is discharged from the reaction region or partial region of the reaction region through one or more further outlets provided in addition to the oxidant outlet. For example, provision may be made to arrange a plurality of oxidant outlets distributed over a housing surrounding the reaction region or the partial region of the reaction region, so that a broadly distributed oxidant flow well covering the volume of the reaction region results in the reaction region or the partial region of the reaction region. A specific arrangement of one of the several outlets for inert fluid in relation to respectively associated inlet openings for inert fluid can also be provided in order to flush out oxidant from certain areas of the reaction region or the partial region of the reaction region in particularly efficiently manner.

The application of inert fluid to the reaction region or the partial region of the reaction region can already begin while the reaction of material cleaned off from the filter surface with the oxidant is taking place. In particular, the inert fluid can then also serve to remove heat. This will often be the case, for example, when the oxidant flow is a mixture of oxidant (e.g. oxygen) and an inert gas (e.g. nitrogen) containing only a small amount of oxidant.

The reaction region or partial region of the reaction region may be traversed by a heat transfer fluid for removal of heat generated during the reaction of material cleaned off from the filter surface with the oxidant. Where appropriate, a flow of the heat transfer fluid may flow through the reaction region or partial region of the reaction region together with the oxidant flow. It is also possible for the oxidant itself to serve as the heat transfer fluid, particularly when the oxidant is only partially reacted because the oxidant is added in excess to accelerate the reaction. The heat transfer fluid can also serve as an inert fluid for flushing out oxidant still present after the reaction has been completed from the reaction region or from the partial reaction region. It may then be convenient to use an inert fluid as the heat transfer fluid without adding oxidant.

The reaction region may contain an agglomerate collection region which is adapted to receive material cleaned off from the filter surface, whereby foreign objects or agglomerates containing foreign objects, which have accumulated on the filter surface, are cleaned off and are collected and held in the agglomerate collection region. The agglomerate collection region then constitutes, in particular, the partial region of the reaction region mentioned above. The agglomerate collection region may be designed such that the material cleaned off from the filter surface falls directly from the raw gas space into the agglomerate collection region without being collected in advance at a position between the filter element and the agglomerate collection region (for example, in a bottom area of a filter housing surrounding the raw gas space).

The agglomerate collection region may have associated therewith a first closure means having a first shut-off member. The first closure means may be designed such that it enables material falling from the filter surface during cleaning-off to be collected, in particular only briefly, in the agglomerate collection region and, after collection of the cleaned-off material in the agglomerate collection region, closes off the reaction region from the raw gas space (in particular closes it off in a gas-tight manner) at least until the concentration of oxidant in the reaction region has dropped to a sufficient extent.

Dropped to a sufficient extent means, in particular, until it can be assumed that the concentration of oxidant in the reaction region has dropped below a predetermined threshold value. This may be the case when the reaction to form oxide-containing foreign objects has occurred so completely that the oxidant has been largely consumed and/or all material has been removed from the reaction region or agglomerate collection region. In practice, this state can be assumed to have been reached by waiting a predetermined time since the oxidation reaction was started, provided that the rate at which the reaction proceeds is sufficiently well known (for example from tests). In general, however, this condition will be reached in any case when the oxidant has been removed from the reaction region or the agglomerate collection region after the reaction has been completed, in particular by suction and/or expulsion by means of inert fluid.

In particular, the first shut-off member can be designed such that receiving material cleaned off from the filter surface in the agglomerate collection region is not significantly impeded in any case when the first shut-off member is open. In particular, the first shut-off member is to be open during cleaning off of the filter element and/or immediately following cleaning off of the filter element and is to remain open in any case until the material falling off the filter surface on the raw gas side during cleaning off has substantially collected in the agglomerate collection region. In particular, the first shut-off member can be opened again after the reaction for the formation of oxide-containing foreign objects in the reaction region has been completed, as soon as the concentration of oxidant in the reaction region has dropped to a sufficient extent and there is no longer any reason to fear that oxidant will enter the raw gas space from the reaction region to such an extent that the process conditions prevailing there will be disturbed.

The material cleaned off from the filter surface can be conveyed from the agglomerate collection region to a downstream discharge region. The discharge region can be located downstream of the reaction region in the sense that no further oxidation of foreign objects takes place in the discharge region itself. However, it is conceivable, and indeed preferred, that the reaction region still includes the discharge region at least in part and that foreign objects are still oxidized in the discharge region depending on the presence of oxidant. In such cases, the oxidant can be supplied not only to the agglomerate collection region, but also or even exclusively to the discharge region.

The discharge region may have a second closure means having a shut-off member that can shut off the discharge region from downstream regions, in particular can shut it off in a gas-tight manner. This second closure means is not cogently necessary, in particular if the aim is to achieve a largely complete conversion of combustible foreign objects to oxide-containing foreign objects before the material introduced into the discharge region reaches the downstream end of the discharge region. Without a second closure means, or when the second closure means is open, the desired oxidation reaction in the discharge region can take place very efficiently with rapid onward transport of conveyed material. When a second closure means is provided, the associated shut-off member can be designed to form a gas-tight barrier in its closed position. However, this feature is not cogently necessary, either; in many cases, a mere shut-off function against particles above a certain size will suffice. In particular, the reaction region may be located between the first closure means and the second closure means. The discharge region may further comprise a collecting container. In the collecting container, solids-containing material, in particular oxide-containing products from the oxidation of material cleaned off from the filter surface, can be collected and finally disposed of.

It may be useful to return to the reaction region, in whole or in part, any oxidant not consumed in the reaction region and, if applicable, any further fluid that is produced as excess fluid or waste fluid (in particular as waste gas in the case of gaseous fluid) after leaving the reaction region, in particular upon reaching a downstream portion of the discharge region. For example, a waste fluid outlet or waste gas outlet may be associated with the collecting container, and the fluid flow exiting the waste fluid outlet can be returned or recirculated completely or in part to the reaction region. Fluid recirculation of the type mentioned here can, in particular, significantly limit the amount of fluid consumed, whether as oxidant, heat transfer fluid, purge fluid and/or conveying fluid. In particular, inert fluid is generally not consumed during transport through the reaction region and can be kept virtually indefinitely in a circuit created in this way. If necessary, fresh oxidant can be added to the recirculated fluid flow to compensate for oxidant consumption in the reaction region.

If recirculation of fluid is provided, in particular a control/regulation system may be provided which is designed such that a fluid pressure within the circuit, in particular within the reaction region, does not exceed and/or does not fall below a predetermined value, in particular remains within a predetermined range. As a control variable for controlling the fluid pressure, it can be provided, for example, that only a portion of the fluid flow accumulating as waste fluid is returned to the reaction region and another portion is discharged into the environment or to an external waste fluid disposal system, the returned fluid flow always being adjusted such that a fluid pressure in the circuit, in particular in the reaction region, remains constant, in particular does not exceed a predetermined value and/or does not fall below another predetermined value, in particular remains within a predetermined range.

In the reaction region, there may be provided a conveying member for transporting material cleaned off from the filter surface. Preferably, the conveying member may be a conveying fluid. For example, when a solids injector is provided for removing material from the agglomerate collecting container into a discharge line, the fluid serving to create a negative pressure or vacuum at a conveying port of the solids injector may serve as a conveying fluid for further transporting material conveyed from the agglomerate collecting container downstream of the solids injector. The conveying member can be used to further transport solids-containing material quickly and effectively. In addition, a conveying member can improve mixing or loosening of solids-containing material so that such material more readily comes into contact with oxidant. Alternatively or additionally, the conveying member could also comprise a screw conveyor, a rotary valve, a gradient or slope and/or a fluidizing device. In particular, the conveying member can be designed such that a transport direction of material cleaned off from the filter surface can be reversed.

Further embodiments of the method described above and of the filter device described in further detail below will be described in the following:

The reaction region may comprise a collecting container. At least one member for moving material cleaned off from the filter surface can be provided in the collecting container, in particular a screw conveyor, a fluidizing device, a pivoting device for the collecting container and/or a mixer.

The reaction region may be designed to be temperature-controlled, in particular heated and/or cooled. Deviating from the above, designs are conceivable in which an ignition device and/or heating device is assigned to the reaction region in order to actively start the reaction of foreign objects with the oxidant. The conversion of cleaned-off material to form oxide-containing foreign objects is then not dependent on the onset of spontaneous oxidation. In all other respects, the foregoing and following statements also apply to this alternative embodiment of the present invention. The applicant reserves the right to direct claims to such alternative embodiments, for example, by way of divisional applications.

The foreign objects may, for example, contain metals or be metals and have a granular, in particular chip-like, powder-like or smoke-like, configuration. In particular, the foreign objects may have a configuration that is not completely oxidized or even not oxidized at all. In particular, the foreign objects may be titanium powder or titanium chips. The foreign objects may be not or not completely oxidized metallic foreign objects. Such foreign objects are created, for example, during additive manufacturing of metallic workpieces, by using powdery metallic materials when building up workpieces layer by layer from a powder bed. Typical metals used in such methods, which may lead to combustible foreign objects in the exhaust air, are titanium, aluminum, magnesium and their alloys, as well as many steels such as structural steel, quenched and tempered steel, high-alloy stainless steels.

The method may further comprise the step of adding filtration aid to the raw gas flow, the filter surface, the reaction region, and/or the discharge region. The filtration aid may be configured to suppress a reaction of foreign objects and/or material cleaned off from the filter surface with oxidant, in particular oxygen. If necessary, fire-retardant auxiliaries may be added to the waste gases so that agglomerates of foreign objects and filtration aids are formed. The addition of a filtration aid based on $SiO_2$ has proven to be particularly suitable for suppressing raw gas fires in additive manufacturing processes in which titanium and/or aluminum-magnesium alloys are used. Known, for example, is the laser sintering method as an additive manufacturing process that produces waste gases that tend to self-ignite.

The filtration aid may be, for example, an inorganic material, in particular, a silicon oxide-based inorganic material or a calcium carbonate-based inorganic material can be used as filtration aid. In particular, the filtration aid may serve to ensure that the oxidation occurring in the reaction region does not get out of control.

When added, the filtration aid can have a granular, in particular powdery, configuration. This allows precise metering of the filtration aid into the raw gas flow and/or into the filter device, in particular for coating filter surfaces (precoating). In addition, an appropriate filtration aid allows a simple feed mechanism, such as a flap or a pressurized gas feed, to be used. The finer-grained the filtration aid is when added, the more efficient the formation of ignition-retardant agglomerates.

The filtration aid may be configured to bind metal-containing foreign objects with a granular configuration in agglomerates, in particular at temperatures of 600° C. or more, in particular at temperatures of 650° C. or more, in particular at temperatures of 1220° C. or more, in particular at temperatures of 750° C. or more, in particular at temperatures of 1320° C. or more. Depending on the filtration aid, temperatures of up to 1000° C., in particular up to 1250° C., in particular up to 1500° C., can be reached without inhibiting the formation of agglomerates too much and/or causing decomposition or disintegration of agglomerates to an undesirably large extent. The agglomerates formed are not flammable or only with difficulty flammable in the temperature ranges mentioned, so that higher operational safety is possible compared with conventional filter devices. Many $SiO_2$ glasses begin to soften at temperatures starting from 600° C. and can then form agglomerates with foreign objects. Depending on the configuration of the $SiO_2$ material, e.g. by adding additives or forming it as a glass foam, the temperature at which softening begins can be varied in suitable manner.

The agglomerates mixed with filtration aid can change to a flowable configuration resembling a glass melt when heated strongly, and change to a glass-like configuration after cooling below the glass transition point. The filtration aids melt and thereby trap the foreign objects in the melt, so that inerting already occurs in this state. Once the melt has solidified, a glassy or vitreous configuration is formed. The formation of a flowable configuration can occur in particular after heating to temperatures of 600° C. or more, in particular 650° C. or more, in particular 1220° C. or more, in particular 750° C. or more, in particular 1320° C. or more. In this process, the agglomerates may have a vitreous configuration after cooling below the glass transition temperature. This can prevent oxidant from coming into contact with the metal-containing foreign objects.

In particular, the filtration aid can be a material that has a vitreous configuration or can be converted to a vitreous configuration under the influence of heat.

Materials based on silicon dioxide with a vitreous configuration are made from a solid and have an amorphous or at least partially crystalline structure. Such glasses have silicon dioxide as their main constituent and their network is formed mainly of silicon dioxide. These include, in particular, so-called silicate glasses. The silicate base glass can be present in pure form, for example as silica glass. Quartz glass is also conceivable if higher softening temperatures are desired. In addition to the silicate base glass, additional components may be present, for example phosphate, borate, and the like.

The filtration aid may have as a main constituent at least one of the following materials: expanded glass beads, glass powder, silicon dioxide particles ($SiO_2$ particles), quartz powder, or a mixture of at least two of these materials. In particular, well-suited glass materials are those made from recycled waste glass (recycling glass), such as expanded glass or foamed glass. Expanded glass is produced by grinding waste glass cullet and adding binding and/or expanding agents thereto. This produces roughly round grains with small, gas-filled pores. Expanded glass can be produced in grain sizes from 0.04-16 mm. The granules have a closed pore structure. Foamed glass, in particular foamed glass ballast, is produced in a similar way. Expanded glass or foamed glass can be produced such that the lower limit for the temperature at which the softening range begins and/or the glass transition temperature assumes a value between 600° C. and 750° C.

In the event of fire, the still powdery or granular agglomerates of filtration aid and metal powder initially formed soften or melt under the action of heat. The flowable glass melt surrounds the metal-containing foreign objects and inerts the same. After solidification of the melt, a glass-like structure is formed, with metal-containing foreign objects permanently enclosed in the filtration aid or surrounded by the filtration aid. As soon as the flowable configuration is formed, the individual self-igniting particles of the metal are bound (vitrified) by the filtration aid. A reaction with oxidants, in particular with oxygen ($O_2$), is only possible with difficulty or is no longer possible at all in the vitrified state. A vitrification process of the type described occurs in particular at those locations where filtration aid agglomerates accumulate. In particular, a filter cake which has formed on the raw gas side on a filter surface and which also consists entirely or at any rate largely of filtration aid agglomerates, can exhibit such a phase transition from a powder-like or granular configuration to a flowable and finally glass-like configuration when heat is generated (for example in the case of a fire). Such a vitrification process can also take place at bulk cone surfaces formed in an agglomerate collection region during operation, leading to efficient inerting of the material contained in the agglomerate collection region. This vitrification process can be assisted by coating the surface of the cone of bulk material forming in the agglomerate collection region with a layer of filtration aid from time to time.

The agglomerates formed can remain chemically stable in the event of fire, i.e. in the presence of an oxidant (usually oxygen), at temperatures of up to 650° C., in particular at temperatures of up to 750° C., in particular at temperatures of up to 850° C., in particular at temperatures of up to 1000° C., in particular at temperatures of up to 1250° C., in particular at temperatures of up to 1500° C.

The filtration aid may also have a gaseous configuration. In this case, the filtration aid can also be used as a heat transfer fluid after oxidation of the foreign objects and/or the material cleaned off from the filter surface has occurred.

The agglomerate collection region and/or the discharge region and/or the reaction region can be acted upon with filtration aid and/or oxidant when the filter elements have been cleaned off and the material cleaned off from the filter surface has deposited in the agglomerate collection region and/or the discharge region and/or the reaction region.

The application of the oxidant to the agglomerate collection region and/or the discharge region and/or the reaction region can be carried out in timed relationship with the application of filtration aid to the agglomerate collection region and/or the discharge region, in particular preceding the application of filtration aid to the agglomerate collection region and/or the discharge region and/or the reaction region, or following the application of filtration aid to the agglomerate collection region and/or the discharge region and/or the reaction region.

A filter device according to the invention for cleaning raw gas carrying foreign objects comprises at least one filter element with at least one filter surface in a raw gas space, to which a raw gas flow containing foreign objects can be fed. Furthermore, an oxidant supply means is provided which is adapted to supply an oxidant to a reaction region located on the raw gas side of the filter surface downstream of the filter surface. The oxidant supply means is designed such that foreign objects contained in material cleaned off from the filter surface and/or in the raw gas flow react with the oxidant in the reaction region to form oxide-containing foreign objects.

The explanations given above with reference to the method according to the invention also apply analogously to the filter device according to the invention. Express reference is made to the preceding explanations in order to avoid repetitions.

In particular, the oxidant may be air or an oxygen-containing gas. In particular, the reaction region may be located downstream of the raw gas space. In particular, the reaction region may be adapted to be shut off with respect to the raw gas space when the oxidant is supplied. These measures help to ensure that the raw gas space remains largely free of oxidant.

The filter device can be designed such that, during the reaction of material cleaned off from the filter surface with the oxidant, unconsumed oxidant can be removed from the reaction region. This can achieve particularly good control of the reaction taking place in the reaction region.

The filter device may have an oxidant inlet which is designed to supply oxidant to the reaction region or to a partial region of the reaction region, and an oxidant outlet which is designed to discharge oxidant from the reaction region or from a partial region of the reaction region, the oxidant outlet in particular being different from the oxidant inlet.

The filter device may further be configured to discharge, in particular to suck off, unconsumed oxidant through the same oxidant outlet as oxide-containing foreign objects formed during the reaction and, if applicable, foreign objects that have not yet been reacted.

The reaction region may include regions downstream of the oxidant outlet, in particular downstream lines, conveying means and/or containers.

It is particularly elegant when the oxidant outlet is connected to a pneumatic conveying means, in particular to a conveying means operating as a solids injector or jet pump and/or to a suction blower. The filter device can also have a pneumatic conveying means, in particular a conveying means operating as a solids injector or jet pump, which is provided for discharging oxide-containing foreign objects formed during the reaction and any foreign objects that have not yet been reacted. This pneumatic conveying means can also serve to remove oxidant or other gaseous substances from the reaction region or from the partial region of the reaction region.

The filter device may be designed to apply negative pressure to the reaction region or the partial region of the reaction region, in particular during and/or following the reaction of material cleaned off from the filter surface with the oxidant. Additionally or alternatively, the filter device may be configured to act upon the reaction region or the partial region of the reaction region with an inert fluid, in particular with inert gas.

The filter device may have furthermore a control system which arranged such that the reaction of material cleaned off from the filter surface with the oxidant takes place in reaction phases, wherein application of oxygen to the reaction region or the partial region of the reaction region is provided during the reaction phases and/or application inert fluid without addition of oxidant to the reaction region or the partial region of the reaction region is provided following a respective reaction phase.

The filter device may have a further fluid inlet, different from the oxidant inlet, into the reaction region or into the partial region of the reaction region for the introduction of inert fluid.

The filter device may comprise a further outlet, provided in addition to the oxidant outlet, for discharging inert fluid and/or oxidant from the reaction region and/or from the partial region of the reaction region.

In any case, the reaction region or the partial region of the reaction region can be acted upon by an inert fluid, in particular by inert gas, and/or can be acted upon by negative pressure after the reaction of material cleaned off from the filter surface with the oxidant has taken place. In this case, the inert fluid displaces the oxidant from the reaction region or from the partial region of the reaction region, so that uncontrolled oxidation can no longer take place. This effect can also be achieved by applying a negative pressure to the reaction region or the partial region of the reaction region, namely that oxidant is sucked off or withdrawn from the reaction region or the partial region of the reaction region. Both measures can also be combined and support each other in this respect.

The filter device may further comprise an oxidant inlet via which oxidant can be supplied to the reaction region or to the partial region of the reaction region. The oxidant inlet may be provided with a shut-off device to allow the oxidant to enter the reaction region or the partial region of the reaction region in controlled manner. The filter device may also have an outlet, in particular different from the oxidant inlet, through which can be discharged oxidant still present in the reaction region or in the partial region of the reaction region after the reaction of material cleaned off from the filter surface with the oxidant has taken place.

The oxidant inlet can preferably be arranged in a head end of the reaction region or the partial region of the reaction region, the head end being arranged on the side of the reaction region or of the partial region of the reaction region facing the raw gas space. In particular, the outlet can be arranged at the foot end of the reaction region or of the partial region of the reaction region, the foot end being arranged on the side of the reaction region or of the partial region of the reaction region facing away from the raw gas space. This arrangement allows the oxidant to be efficiently and reliably supplied to the reaction region, and also allows material cleaned off from the filter surface to be reliably emptied from the reaction region or the partial region of the reaction region with an oxidant flow through the outlet.

The filter device may also be provided with a common outlet through which residues of the reaction of material cleaned off from the filter surface with the oxidant, in particular oxide-containing foreign objects formed, completely or partially unreacted substances and excess oxidant, can be removed from the reaction region or from the partial region of the reaction region. This results in a simple structure for the filter device and, in particular, for the reaction region. The reaction region or the partial region of the reaction region may have a heat transfer fluid flowing therethrough for removing heat generated during the reaction.

The reaction region may also contain an agglomerate collection region which is designed to receive material cleaned off from the filter surface, whereby foreign objects or agglomerates containing foreign objects, which have accumulated on the filter surface, following cleaning-off, can be collected and stored in the agglomerate collection region. The agglomerate collection region then constitutes, in particular, the partial region of the reaction region mentioned above.

The agglomerate collection region may have associated therewith a first closure means having a first shut-off member and being designed such that it enables material falling from the filter surface during cleaning off to be collected, in particular only briefly, in the agglomerate collection region and, after collection of the cleaned-off material in the agglomerate collection region, closes off the reaction region from the raw gas space in any case at least until the concentration of oxidant in the reaction region has dropped to a sufficient extent.

Furthermore, the filter device may have a discharge region downstream of the agglomerate collection region, into which material cleaned off from the filter surface can be conveyed, the reaction region in particular comprising at least part of the discharge region, and in particular oxidant can be fed to the agglomerate collection region and/or the discharge region.

The discharge region may have a second closure means, wherein in particular the reaction region is arranged between the first closure means and the second closure means.

In the reaction region, a conveying member may be provided that is configured to transport material cleaned off from the filter surface, wherein the conveying member comprises, in particular, a conveying fluid. For example, when a solids injector is provided for discharging material from the agglomerate collecting container into a discharge line, the fluid serving to generate a negative pressure at a conveying port of the solids injector may serve as a conveying fluid for further transporting material conveyed from the agglomerate collecting container downstream of the solids injector.

With respect to the advantages and benefits of the individual features, reference is made to the description of the method according to the invention and the further features.

The oxidant may be air or an oxygen-containing gas, in particular with an oxygen content of 1 to 21 percent by volume. The oxidant enables a spontaneous reaction of foreign objects and/or material cleaned off from the filter surface in the reaction region. The reaction region may be located downstream of the raw gas space.

The filter device may provide an arrangement for supplying a heat transfer fluid to the reaction region and discharging the heat transfer fluid after flowing through the reaction region or the part of the reaction region to remove the heat generated during oxidation along with the oxide-containing foreign objects and excess oxidant.

A conveying member for transporting material cleaned off from the filter surface may be provided in the reaction region, in particular a screw conveyor, a rotary valve, a gradient or slope and/or a fluidizing device. The conveying member may be designed in particular such that a transport direction of material cleaned off from the filter surface is reversible. In particular, the conveying member may be a pneumatic conveying means, such as a solids injector.

The discharge region may include a waste fluid outlet region through which fluid material produced after passing through the process may be discharged. If the oxidative treatment of material cleaned off from filter surfaces, as described herein, is carried out by means of gaseous fluid, in particular by means of gaseous oxidant, heat transfer fluid, purge fluid and/or conveying fluid, gaseous effluent (waste gas) will primarily be produced in the waste fluid outlet region. In the present application, the terms waste gas or waste gas outlet region are also used for simplification, regardless of whether fluid accumulating at the end of the process is predominantly in the gaseous or liquid state. The waste gas outlet region may have a filter unit with at least one filter element, and a waste gas outlet. The waste gas outlet region may comprise in particular a pressurized-gas cleaning-off device. The pressurized-gas cleaning-off device may be configured to apply pressure pulses to the at least one filter element. Alternatively, the filter unit may have at least one filter element with storage filters. The waste gas outlet region may be designed such that a mixture of residues formed in particular during the reaction and excess oxidant can be filtered therein and discharged from the filter device through the waste gas outlet.

The filter device may have in particular a fluid recirculation unit which is designed such that oxidant which is not consumed in the reaction region and, if applicable, further fluid which accumulates as waste fluid or waste gas after leaving the reaction region is returned completely or in part to the reaction region. In particular, a control/regulation system may be provided which is designed such that a fluid pressure within the circuit thus created, in particular in the reaction region, does not exceed a predetermined upper limit value and/or does not fall below a predetermined lower limit value, in particular remains within a predetermined range.

The discharge region may comprise a collecting container for solids-containing material, in which solids-containing material, in particular the oxide-containing foreign objects, may be collected. Once filled, the collecting container can be removed by an operator and replaced with an empty collecting container. Interruption of the filtration process can thus be avoided. In particular, the discharge region may comprise a collecting container for separating solids-containing material, the collecting container having an outlet for fluid, in particular gaseous, material (waste gas outlet). In this case, the outlet may have associated therewith a filter unit for cleaning the fluid material from foreign objects of the type described above. Furthermore, a fluid recirculation unit of the type described above may be associated with the outlet.

Arrangements for temperature control, in particular for heating and/or cooling the reaction region or the part of the reaction region, may be associated with the reaction region or the part of the reaction region. In alternative embodiments, the reaction region or the part of the reaction region may comprise an ignition device and/or a heating device for actively starting the reaction of foreign objects with the oxidant.

The filter device may comprise furthermore a filtration aid feed arrangement having a filtration aid feed line opening into the raw gas space, into the raw gas flow upstream and/or downstream of the raw gas space and/or into the reaction region and/or into the discharge region, in particular into the collecting container, for feeding filtration aid. The filtration aid may thereby be configured to suppress a further reaction of foreign objects with oxidant, in particular with oxygen, as soon as a first oxidation of the material cleaned from the filter surface has taken place.

BRIEF DESCRIPTION OF THE DRAWINGS

The invention and particular embodiments of the invention will be explained in more detail in the following by way of exemplary embodiments.

DETAILED DESCRIPTION

Figure 1:
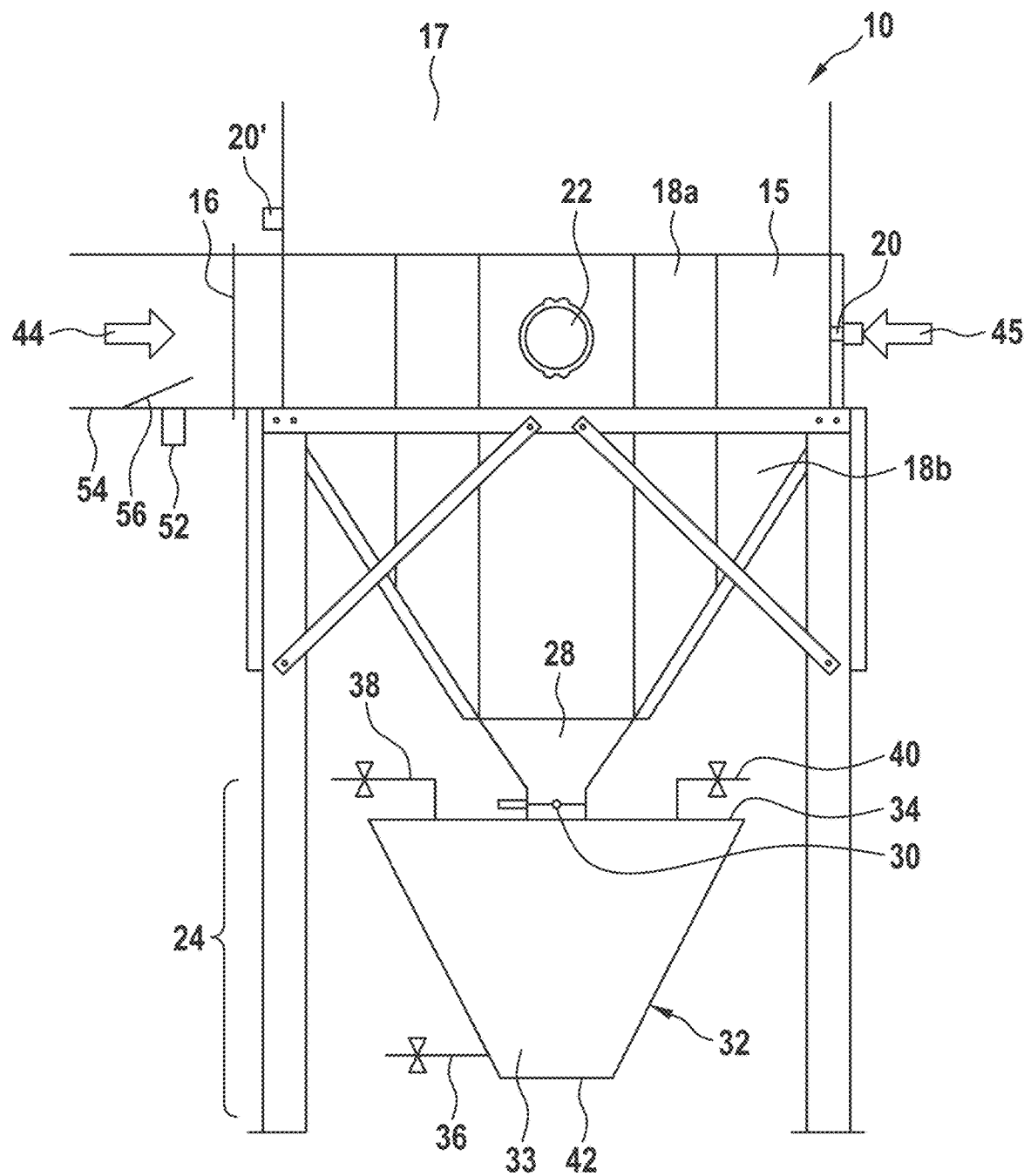
FIG. 1 shows a side view of a filter device according to the invention.
Figure 2:
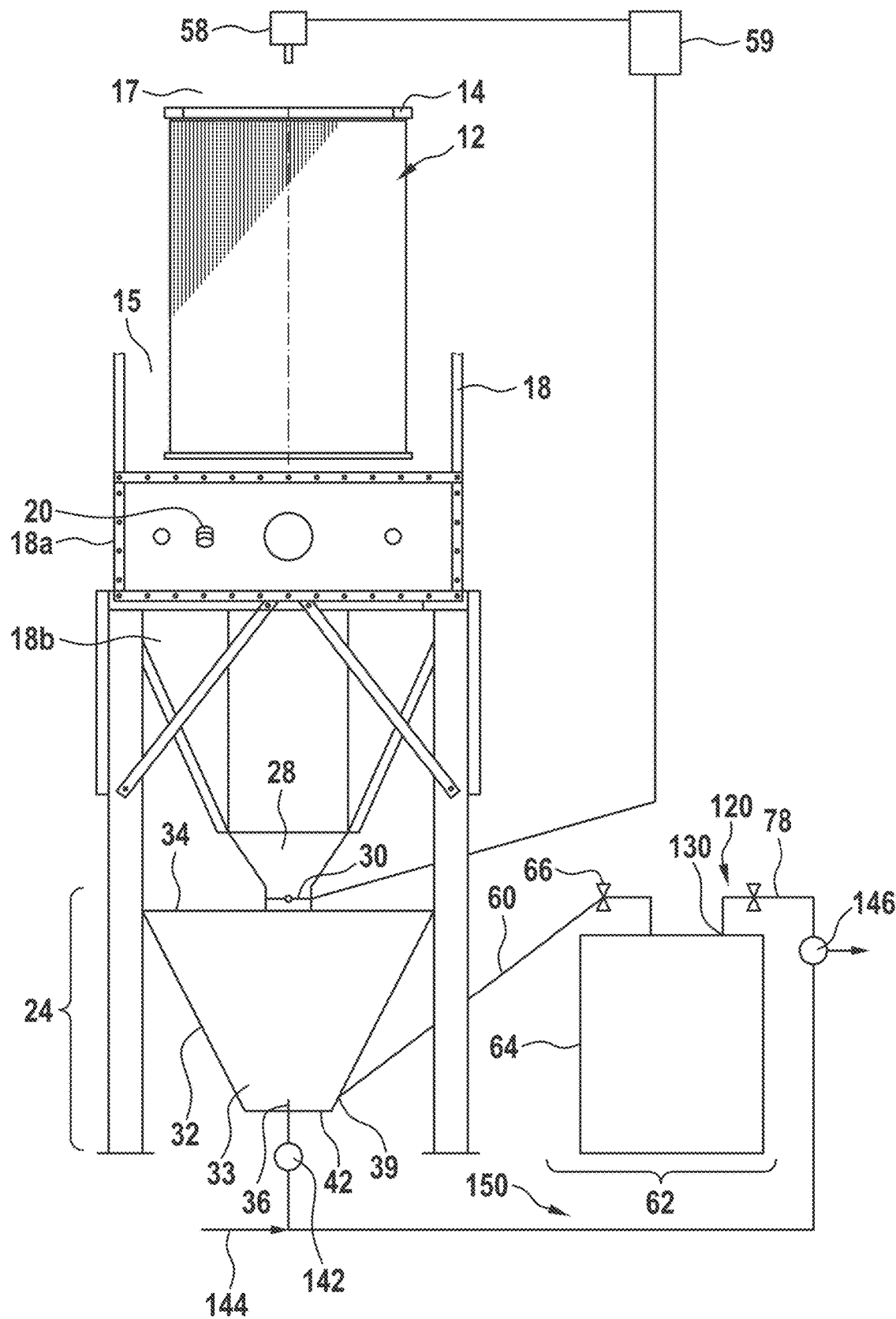
FIG. 2 shows the filter device of FIG. 1 in a side view rotated by 90 degrees with respect to the view of FIG. 1.

FIGS. 1 and 2 show, in side views rotated 90 degrees relative to each other, a filter device 10 for cleaning raw gas carrying foreign objects according to an embodiment according to the invention. The filter device 10 comprises a filter unit 12 with at least one filter element 14 (not shown in FIG. 1, in FIG. 2 one of the filter elements 14 of the filter unit 12 is indicated). The filter unit 12 is mounted above a raw gas inflow opening 16 in an upper portion of a housing 18, which is partially omitted for clarity. The filter unit 12 comprises a plurality of filter elements 14 in the form of dry filters, each of the filter elements 14 being configured as a rigid-body filter. This is intended to express that the walls of the filter element 14 have sufficient rigidity to hold the filter element 14 upright without the aid of further supporting structures. In this sense, the filter element 14 is inherently stable. The filter elements 14 are suspended from a horizontally extending common holder and extend parallel to each other in the vertical direction. This is schematically indicated in FIG. 2, which shows one of the filter elements 14 approximately in its installation position. It should be noted that different installation of the filter elements 14 in the housing 18 is also possible, for example horizontal installation, in which the filter elements extend in the horizontal direction and are attached to a vertical holder. Each of the filter elements 14 has at least one filter surface which is acted upon by the raw gas. In FIGS. 1 and 2, the filter surface acted upon by the raw gas is located on the outside of one of the respective filter elements 14 (raw gas side). After passing through a wall of the filter element 14, purified gas passes from the raw gas side to the clean gas side which faces the interior space surrounded by the walls of the filter element 14. The filter element 14 is open towards the top so that a clean gas space 17 extends from the interior space to an area above the filter unit 12.

In the lower region 18*b* shown in FIGS. 1 and 2, the housing 18 takes the form of a funnel with downwardly tapering side walls. Adjacent to the lower region 18*b* is a reaction region 24 into which foreign objects-containing material, which has accumulated at the filter elements on the raw gas side, falls after cleaning-off of a respective one of the filter elements 14 (for example, by applying a pressure pulse to the respective filter element 14, see the pressurized-gas cleaning-off unit 58 schematically indicated in FIG. 2). In particular, the material entering the reaction region 24 contains foreign objects-containing material from the raw gas flow and/or from material cleaned off from the filter surface. The reaction region 24 is located downstream of the housing 18 and is connected to the lower region 18*b* of the housing 18 surrounding the raw gas space 20 via a passage 28. A first closure means with a first shut-off member 30 is arranged in the passage 28. The shut-off member 30 can be designed as a shut-off valve, as a flap, as a disc valve, or as a pinch valve, just as other shut-off members described herein.

In the example shown, the reaction region 24 has a funnel-shaped container 32 which forms an agglomerate collection region 33. In the example shown, the container 32 has side walls that taper downwardly, away from the raw gas space 20. It is also possible for the container 32 to assume another shape, such as a cylindrical shape or a rectangular shape. The container 32 has an optional further fluid inlet 38 at its head end 34, i.e. the end of the container 32 facing the raw gas space 20, and a further fluid outlet 40 through which excess fluid, such as excess oxidant, excess purge fluid, a heat transfer fluid for removing heat generated during the reaction, or a mixture of the aforementioned fluids, can leave the container 32. It should be noted that a plurality of additional fluid inlets 38 and a plurality of additional fluid outlets 40 may be provided, if desired, and that the arrangement of these further inlets or further outlets on the container 32 may be selected as desired.

The container 32 has an oxidant inlet 36 in its lower region or at its base end 42, that is, at the end of the container 32 remote from the raw gas space 15. The oxidant inlet 36 is configured to allow a flow of oxidant to be introduced into the agglomerate collection region 33. It is possible that, in addition to oxidant such as oxygen, other fluids may be introduced through the oxidant inlet 36 into the container 32 surrounding the agglomerate collection region 33, for example inert fluids, in particular inert gases such as nitrogen. Admixture of a further fluid to the oxidant may serve to adjust a suitable concentration of oxidant, for purging purposes and/or for removal of heat. If the further fluid serves as heat transfer fluid and/or purge fluid, the further fluid could alternatively or additionally be introduced into the container 32 via one or more further inlets, such as the aforementioned further inlet 38. In particular, the oxidant inlet 36 may be configured as a fluidizing arrangement, such as having a fluidizing tray, so that upon introduction of the oxidant flow, loosening or fluidization of solids-containing material in the agglomerate collection region 33 is achieved as well.

The container 42 further includes an outlet 39 for discharging solids-containing material, which in the embodiment shown is located in the lower region 42 of the container 32. Such solids-containing material will preferably include oxide-containing foreign objects formed during oxidation. However, it is not necessary that all of the foreign objects and/or material cleaned off from the filter surface which has entered the agglomerate collection region 33 be already completely oxidized by the time it is removed from the container 32 via the outlet 39. It is also possible that oxidation of oxidizable foreign objects may still occur downstream of the outlet 39.

The process environment in additive manufacturing processes that produce oxidizable or combustible residues should normally be inert and not change, or at least not excessively. This also applies to the treatment of waste gas generated in the process, in particular if the cleaned waste gas is recirculated into the process in a loop or circuit. If combustible foreign objects in the waste gas can be cleaned off by means of a dry filter, an inert mixture of inert carrier gas and particulate foreign objects will generally enter the raw gas space, in which the proportion of oxygen and other substances that can act as oxidants is below a predetermined threshold. Thus, the filtration of the raw gas carrying combustible foreign objects takes place under inert conditions and addition of oxygen or other substances having an oxidizing effect to the raw gas space is not desired. This complicates the possibility of rendering solids-containing material accumulated on the filter surface harmless by oxidation.

The raw gas flow, which is schematically indicated by arrow 44 in FIG. 1 and which carries foreign objects to be separated by the device 10, enters the raw gas space 15 enclosed by the housing 18 via a raw gas feed line 54 through the raw gas inlet opening 16. After entering the raw gas space 15, the raw gas flow 44 is transported to the filter unit 12. On the side of the housing 18 opposite the raw gas inflow opening 16 is a filtration aid feed opening 20, through which filtration aids, for example solids with flame-retardant properties such as $CaCo_3$ or solids based on $SiO_2$, can be fed from a storage container into the raw gas space 15. The filtration aids can be introduced into the raw gas space 15 before the raw gas space 15 is charged with the raw gas flow 44. The introduced filtration aids then accumulate, in particular, on filter surfaces of the filter elements 14 and/or on walls of the raw gas space 15, where they each form a layer of filtration aid (precoat layer). The flow of filtration aids entering the raw gas space 15 through the filtration aid feed opening 20 is indicated by an arrow 45 in FIG. 1.

Alternatively or additionally, a filtration aid feed opening 52 may be disposed in the raw gas feed line 54. The raw gas feed line 54 is connected to the raw gas inflow opening 16. This allows the filtration aid to be introduced into the raw gas flow 44 before the latter enters the raw gas space 15 of the filter device 10. This results in advantageous mixing of foreign objects contained in the raw gas flow 44 and the filtration aid so as to raise the self-ignition threshold of the raw gas. Optionally, a baffle plate or distributor plate 56 may be disposed near the filtration aid feed opening 52 such that the filtration aid is uniformly distributed in the raw gas flow 44.

Associated with the filter unit 12 is a pressurized-gas cleaning-off unit 58, shown schematically in FIG. 2, which is located in the clean gas space 17 of the filter unit 12 above the filter elements 14. At certain intervals in time, the pressurized-gas cleaning-off unit 58 pressurizes a respective filter element 14 so that it experiences a pressure surge from the clean gas space 17. The pressure surge causes foreign objects, such as readily self-igniting foreign objects and, in some cases also filtration aids, accumulated on the filter surface on the raw gas side of the respective filter element 14 to detach from the filter element 14 and fall downward as a result of their gravity. This material, cleaned off from the filter surface, then falls through the passage 28 into the agglomerate collection region 33 in the reaction region 24, together with foreign objects and also filtration aids.

The first shut-off member 30 is normally open, so that there is a fluid communication between the raw gas space 15 and the reaction region 24. This holds in particular at the beginning of and during a cleaning-off cycle for the filter elements 14. In this way, material falling off the filter surface during cleaning off can fall unimpeded, or at least substantially unimpeded, into the agglomerate collection region 33 of the reaction region 24 and does not deposit significantly on the floor or walls of the housing 18 surrounding the raw gas space 15. As soon as the cleaning-off has taken place and an oxidation cycle is to be initiated in the reaction region 24, the first shut-off member 30 is closed so that the agglomerate collection region 33 of the reaction region 24 is separated from the raw gas space 15 in fluid-tight manner at least for the period of time over which an oxidant-containing environment prevails in the agglomerate collection region 33. Then, the oxidant is introduced into the agglomerate collection region 33 via the oxidant inlet 36 to cause spontaneous oxidation of material entering the agglomerate collection region 33. The oxidant inlet 36 is designed such that the oxidant flows through or mixes the solids-containing material in the agglomerate collection region 33, in particular the oxidizable material cleaned off from the filter surface, and thus initiates the oxidation of this material spontaneously, i.e. without additional input of energy via heating device, ignition device or the like. The oxide-containing, now inert foreign objects formed by the oxidation, excess oxidant and other substances can then be conveyed via the outlet 39 along a discharge line 60 into a discharge region 62 downstream of the agglomerate collection region 33. After completion of this discharge process, the concentration of oxidant in the agglomerate collection region 33 has dropped to such an extent that contamination of the raw gas space 15 is no longer to be feared, whereupon the shut-off member 30 can be opened again. To assist in the expulsion of oxidant from the container 32 surrounding the agglomerate collection region 33, a purge fluid in the form of nitrogen, a noble gas or another inert gas can be introduced into the container 32 via the optional further inlet 38. This allows the remaining oxidant still present in the container 32 to be removed from the container 32, and thus from the agglomerate collection region 33, via the further fluid outlet 40 to create an inert environment in the container 32 or in the agglomerate collection region 33. When the shut-off member 30 is open, foreign objects from the raw gas flow 44 and material cleaned off from the filter surface can again enter the reaction region 24 without intermediate storage. By not collecting the foreign objects in the lower region 18b of the housing 18, dust bridges are efficiently avoided, which would otherwise strongly impair subsequent sliding of the foreign objects into the reaction region 24.

As a variant, it is conceivable that, via the oxidant inlet 36 and/or via the further inlet 38, a continuous flow of an inert fluid, for example nitrogen or a noble gas, is at least temporarily passed through the container 32, which passes through the agglomerate collection region 33 of the reaction region 24, flows to the outlet 39 and leaves the container 32 again through the latter. Once cleaning off of the filter element 14 or a plurality of filter elements has occurred and the shut-off member 30 is closed, a sufficient amount of oxidant can be added to this fluid flow so that the material located in the agglomerate collection region 33 can be reacted or converted by oxidation. Once the conversion has occurred to the desired degree, the supply of oxidant to the fluid flow could be stopped, and the oxide-containing foreign objects or the reacted foreign objects could be transported away with the fluid flow from the agglomerate collection region 33 or from the container 32 via the discharge line 60 to the discharge region 62.

The coordination between the activation of the pressurized-gas cleaning-off unit 58, i.e. the cleaning off of a respective one or more respective ones of the filter elements 14 from material adhering to the filter surface, and the opening and closing of the shut-off member 30 is performed by a control unit 59. The control unit 59 may be configured such that the shut-off member 30 is open as a default setting, so that the foreign objects in the raw gas that do not reach the filter element 14 or fall off a filter element surface outside of cleaning-off cycles thereby fall directly into the agglomerate collection region 33 of the reaction region 24. Even during the cleaning-off of the filter elements 14, the shut-off member 30 remains open to allow the material cleaned off from the filter surface to be discharged into the reaction region 24 without intermediate storage. As soon as cleaning off is completed, the control unit 59 closes the shut-off member 30 for a short time so that oxidant can be admitted into the reaction region 24, which is now separated from the raw gas space 15, in particular into the container 32 surrounding the agglomerate collection region 33. After a predetermined time, it can be assumed that material cleaned off from the filter surface in the agglomerate collection region 33 has been oxidized to a sufficient extent to form oxide-containing foreign objects. To the extent that added oxidant has not been consumed in the reaction, excess oxidant is then removed from the agglomerate collection region 33 so that an inert environment again prevails in the reaction region 24, that is, an oxidant concentration is so low that oxidation no longer occurs even if foreign objects or material cleaned off from the filter surface enters the agglomerate collection region 33. Then, the control unit 59 may cause the shut-off member 30 to be reopened to again allow foreign objects and material cleaned off from the filter surface to enter into the agglomerate collection region 33.

In certain embodiments, provisions could be made for the container 32 to be moveable or acted upon by an agitation device and/or a rapping device to produce corresponding rocking movements, vibrations, shaking movements, etc., of the container 32 to facilitate subsequent or continued downsliding of solids-containing material through the outlet 39. In this manner, emptying of the agglomerate collection region 33 as completely as possible can be achieved.

In addition to the discharge line 60, the discharge region 62 preferably also comprises a collecting container 64 in which the oxide-containing foreign objects are collected. Fluid material, in particular gaseous material, that has reached the collecting container 64 via the discharge line 60 is discharged again from the collecting container 64 via a waste gas outlet 130.

Optionally, a second closure means with a second shut-off member 66 can be provided in the discharge line 60, for example in a region near the collecting container 64. The second closure means is thus also to be associated with the discharge region 62. The second closure means is designed to separate an upstream part of the discharge region 62, which still belongs to the reaction region 24 and in which oxidation of material containing foreign objects still takes place, from a downstream part in which such oxidation no longer takes place. However, it is not cogently necessary to provide the second closure means. It has been found that the desired oxidation reactions can take place completely in the discharge region 62, in particular in the discharge line 60, and in particular can be completed before the material conveyed through the discharge line 60 reaches a downstream end of the discharge line 60 at which the discharge line 60 opens, for example, into the collecting container 64.

A downstream end of the discharge line 60 opens into the collecting container 64. Upon reaching the collecting container 64, solids-containing material, in particular oxide-containing foreign objects formed during oxidation, falls into the collecting container 64 of the discharge region 62 and can thus be disposed of. At the top, a waste gas outlet region 120 (see FIG. 6) opens into the collecting container 64. In the waste gas outlet region 120, there is a waste gas outlet 130 through which excess fluid material, in particular oxidant, purge fluid, conveying fluid, heat transfer fluid and other fluid can be discharged from the discharge region 62. This excess fluid material (hereinafter also referred to simply as waste gas) may be discharged to the environment or to an exhaust system via a shut-off valve 78, if desired. Alternatively, all or a portion of this excess fluid material may be returned to the reaction region 24, in particular to the oxidant inlet 36, as shown in FIG. 2. Also in this case, a shut-off valve 78 may be provided optionally. The arrangement shown in FIG. 2 will be described in more detail in the following.

Figure 3:
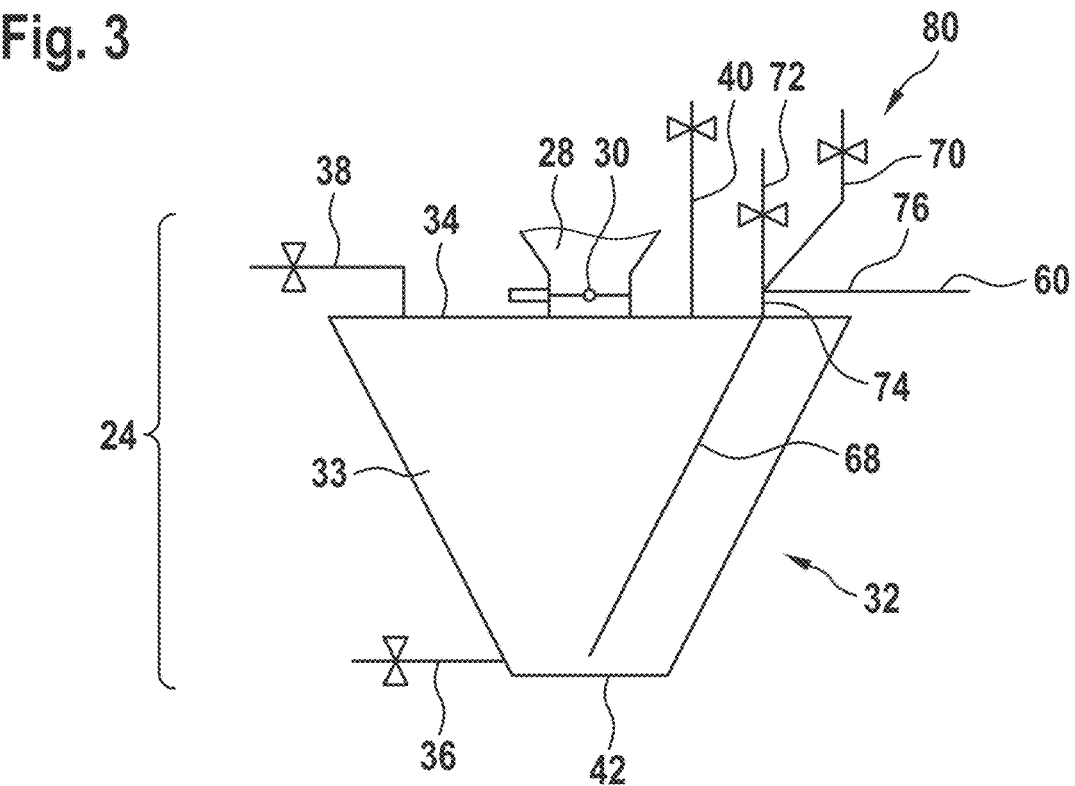
FIG. 3 shows a schematic representation for an embodiment of a reaction region.

FIG. 3 shows a further embodiment of a container 32. Only the features which differ from the container 32 of FIGS. 1 and 2 will be described in more detail below. For a description of the additional features in FIG. 3, reference is made to the description of FIGS. 1 and 2, in which identical or corresponding features are indicated by the same reference numerals. In the embodiment of FIG. 3, a pneumatic conveying means, in this case configured as a solids injector 80, is provided to convey material from the container 32. In this embodiment, a hollow lance 68 extends from the head end 34 of the container 32 into the interior of the container 32. A tip of the hollow lance 68 extends to a location near the foot or base end 42 of the container 32. The hollow lance 68 includes one or more openings in a region adjacent its tip through which material can be discharged from the container 32, and is connected to a conveying port 74 of the solids injector 80.

Alternatively or in addition to a solids injector, there could also be provided a suction blower to convey material, particularly gaseous material, from the container 32. Like the solids injector, the suction blower could be connected to the container 32 via the hollow lance 68 and could be provided in particular for withdrawing or sucking off oxidant and other gaseous fluid from the agglomerate collection region 33.

In addition to the conveying port 74, the solids injector 80 has a conveying fluid inlet 70 which can be supplied with conveying fluid, for example air, and a material outlet or discharge 76 which communicates with the conveying fluid inlet 70 and the conveying port 74. The conveying port 74 connects the hollow lance 68 to a passageway connecting the conveying fluid inlet 70 to the material discharge 76. The conveying fluid inlet 70 as a rule has a shape tapering toward the material outlet 76, so as to accelerate the conveying fluid in the passageway when acted upon by conveying fluid, thereby creating a negative pressure in the hollow lance 68 and thus draw solids-containing material out of the container 32 through the hollow lance 68. The material discharge 76 of the solids injector 80 is connected to the discharge line 60. When the conveying fluid inlet 70 is acted upon, the conveying fluid is conveyed from the conveying fluid inlet 70 via the material discharge 76 to the discharge line 60, thereby generating a negative pressure in the hollow lance 68. As a result of this negative pressure, solids-containing material present in the container 32, in particular oxide-containing foreign objects formed during the reaction, is sucked in together with gaseous material, in particular unconsumed oxidant, and conveyed through the hollow lance 68 to the material discharge 76. In the process, the sucked-in material mixes with the conveying fluid and is conveyed through the material discharge 76 into the discharge line 60 of the discharge region 62.

Depending on the admission of conveying fluid to the conveying fluid inlet 70, the suction strength of the solids injector 80 can be adjusted and thereby the respective amount of solids-containing material and gaseous material conveyed from the container 32 or the mixing ratio between material conveyed from the container 32 and admixed conveying fluid can be adjusted. Ultimately, this allows for precise control of the oxidation reactions occurring in the container 32 as well as any oxidation reactions that may still be occurring downstream of the solids injector 80 in the discharge line 60.

The oxide-containing foreign objects can also be sucked off from the container 32 in an alternative manner. For this purpose, a negative pressure can be generated in the discharge region 62 by, for example, a blower or a suction device, whereby the oxide-containing foreign objects are sucked off through the hollow lance 68 into the discharge line 60 of the discharge region 62. In addition to the oxide-containing foreign objects, excess oxidant and/or additional substances or fluids, for example, may also be sucked off from the container 32. As soon as the withdrawal is complete, i.e., as soon as little to no oxidant remains in the agglomerate collection region 33, the shut-off member 30 can release the passage 28 from the raw gas space 15 to the agglomerate collection region 33. In such a constellation, the conveying fluid inlet 70 is not necessary, but may optionally be provided to assist in the removal of oxide-containing foreign material.

Instead of, or in addition to, using a negative pressure to draw off the oxide-containing foreign objects, a conveying fluid, particularly a conveying gas, could also be introduced into the container 32 via the purge fluid inlet 38. The conveying fluid is under positive pressure and then, pneumatically in the case of a gas, forces the oxide-containing foreign objects through the hollow lance 68 into the discharge line 60 to the discharge region 62. For assistance, conveying fluid can be introduced into the discharge line 60 through the conveying fluid inlet 70 to transport the oxide-containing foreign objects further and prevent the formation of dust bridges. The conveying fluid may be an inert fluid such as nitrogen. The conveying fluid may also include oxidants, such as oxygen. In this manner, it can be ensured that the oxidation reactions continue to occur as material is transported from the container 32 to the discharge region 62. For example, it is convenient to use air as the conveying fluid if the addition of oxidant to the conveying fluid is desired. One can also use an inert fluid as the conveying fluid and introduce oxidant into the container 32 via a separate inlet, if desired.

To safely remove the excess oxidant from the agglomerate collection region 33 of the reaction region 24 or the container 32, the excess oxidant may be removed from the interior of the container 32 via the fluid outlet 40 following removal of the oxide-containing foreign objects, preferably by admitting an inert fluid, for example nitrogen or inert gas, through the inlet 38 or the oxidant inlet 36, the inert fluid displacing the excess oxidant from the agglomerate collection region 33 of the reaction region 24 or the container 32.

Furthermore, it is possible, after material has been removed from the container 32 by means of the solids injector 80, to also supply an inert fluid, for example an inert gas such as nitrogen, to the container 32 by means of the solids injector 80. The solids injector 80 has an additional port 72 that can be acted upon with a purge fluid to restore a potentially clogged fluid connection between the hollow lance 68 and the material discharge 76. By applying inert fluid to the purge port 72 and, if necessary, closing the material discharge 76, the inert fluid can be easily conducted into the container 32 to flush out or purge any oxidant still remaining in the agglomerate collection region 33.

Figure 4:
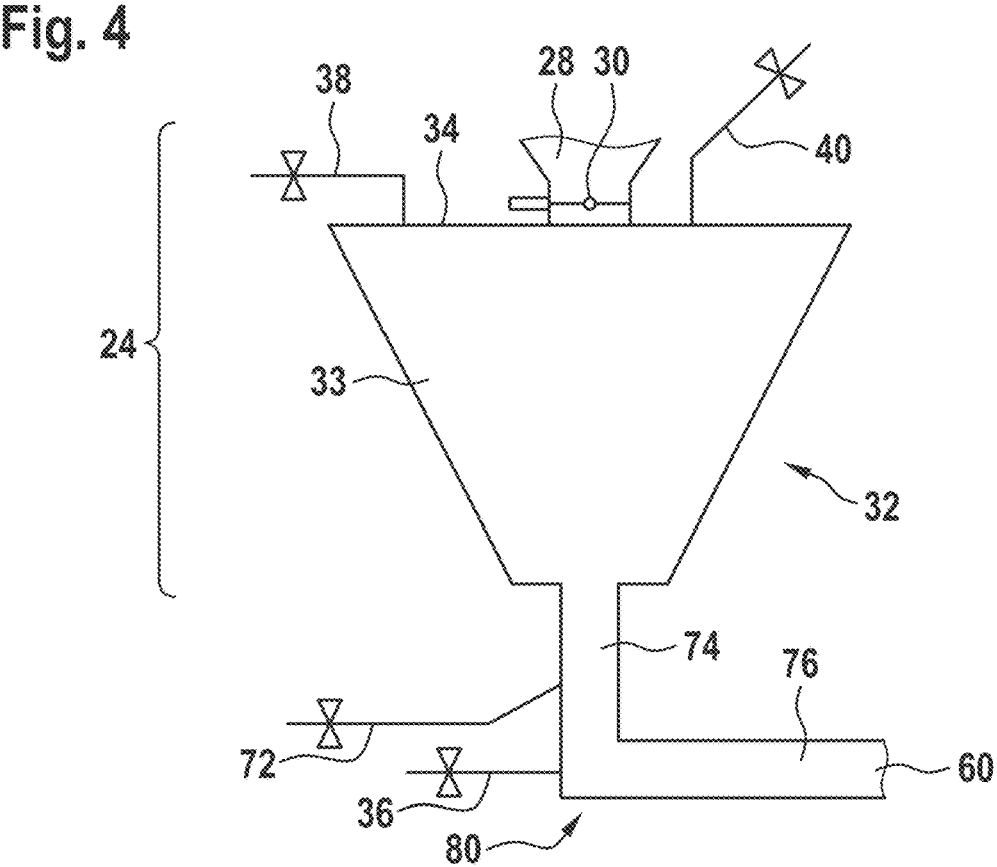
FIG. 4 shows a schematic representation for a further embodiment of a reaction region.

FIG. 4 shows another embodiment of a container in which, similar to FIG. 3, a pneumatic conveying means, in this case configured as a solids injector 80, is provided to convey material from the container 32. Only those features that differ from the container 32 of FIGS. 1, 2 and 3 will be described in more detail below. For a description of the further features in FIG. 4, reference is made to the description of FIGS. 1, 2 and in particular of FIG. 3, in which the same or corresponding features are provided with the same reference numerals.

Differently from the embodiment of FIG. 3, the embodiment according to FIG. 4 has the solids injector 80 arranged at the lowest point of the container 32, in the variant shown with the side walls of the container 32 converging downwards, where the side walls come closest to each other. An opening is formed at the bottom of the container 32, which communicates with the conveying port 74 of the solids injector 80 and through which material can be drawn in from the container 32. It is understood that also a plurality of such openings may be formed at the bottom of the container 32. In this embodiment, the conveying fluid inlet 36 of the solids injector 80, which can be acted upon by conveying fluid, for example air, also serves as an oxidant inlet 36 for the container 32 and is therefore designated with reference numeral 36.

The material discharge 76 in turn is connected to the discharge line 60. As is customary, the conveying fluid inlet 36 communicates with the material discharge 76 via a passageway having a shape tapering toward the material discharge 76 so as to accelerate the conveying fluid in the passageway when conveying fluid is applied to the conveying fluid inlet 36. When conveying fluid is applied to the conveying fluid inlet 36, the conveying fluid is conducted from the conveying fluid inlet 36 to the discharge line 60 via the material discharge 76, thereby creating a negative pressure which causes solids-containing material present in the container 32, in particular oxide-containing foreign objects formed during the reaction, to be sucked or drawn in along with gaseous material, in particular unconsumed oxidant, and conveyed to the material discharge 76. In the process, the sucked-in material mixes with the conveying fluid and is conveyed through the material discharge 76 into the discharge line 60 of the discharge region 62.

When only a slight positive pressure is applied to the conveying fluid inlet 36, the acceleration of the conveying fluid in the passage to the material discharge 76 is not sufficient to create a significant negative pressure. In this case, the conveying fluid is conducted into the container through the conveying port 74. This effect can be further enhanced by closing off the material discharge 76. Thus, if the conveying fluid inlet 36 of the solids injector 80 is acted upon by oxidant-containing conveying fluid, such as air, at only a slight positive pressure, the end effect is that oxidant is supplied to the container 32 or the agglomerate collection region 33. Otherwise, the operation of the solids injector 80 in FIG. 4 is the same as that of the solids injector 80 shown in FIG. 3.

The solids injector 80 shown in FIG. 4 also has a port 72 that can be acted upon with a purge fluid to restore a potentially clogged fluid connection between the conveying port 74 and the material discharge 76. By applying inert fluid to the purge port 72 and, if necessary, closing the material discharge 76, inert fluid can be easily introduced into the container 32 to purge any oxidant still remaining in the agglomerate collection region 33. By applying oxidant-containing inert fluid to the port 72 in this manner, one could also introduce oxidant into the agglomerate collection region 33, if desired.

Figure 5:
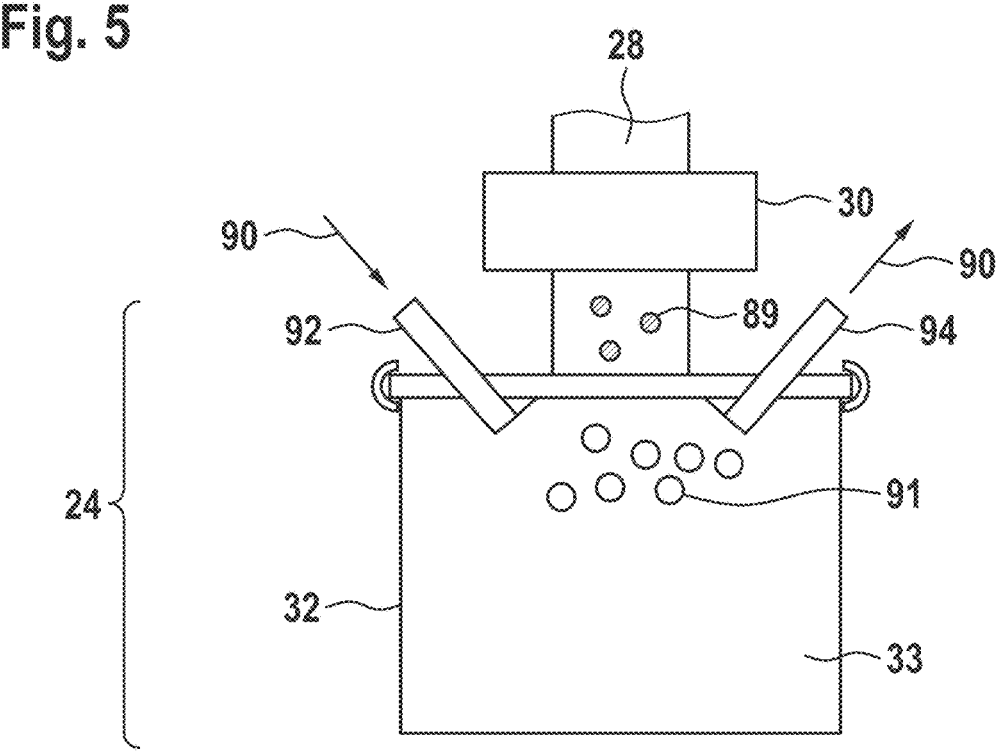
FIG. 5 shows a schematic representation for a further embodiment of a reaction region.

FIG. 5 shows the agglomerate collection region 33 of the reaction region 24 located in the container 32 with the first shut-off member 30 upstream in the direction of flow of the cleaned-off material. FIG. 5 shows schematically how the material 89 cleaned off from the filter surface falls into the container 32 from the direction of the shut-off member 30. As it does so, the falling material cleaned off from the filter surface crosses an oxidant flow 90 flowing from an oxidant inlet 92 to an oxidant outlet 94. As the oxidant flow 90 passes through, the material cleaned off from the filter surface spontaneously reacts with the oxidant, thereby transforming into poorly reactive or inert and/or oxide-containing foreign objects 91. The oxide-containing foreign objects formed during oxidation are discharged primarily through the oxidant outlet 94 via the discharge line 60, not shown in FIG. 5, to the discharge region 62 downstream of the container 32. Oxidation of foreign objects that have not yet been oxidized may also continue in the discharge line 60. The heat generated by the reaction may be dissipated through the oxidant outlet 94 along with the oxidant flow 90, which as a rule is a mixture of oxidant, such as oxygen, and an inert component, such as nitrogen or inert gas.

Figure 6:
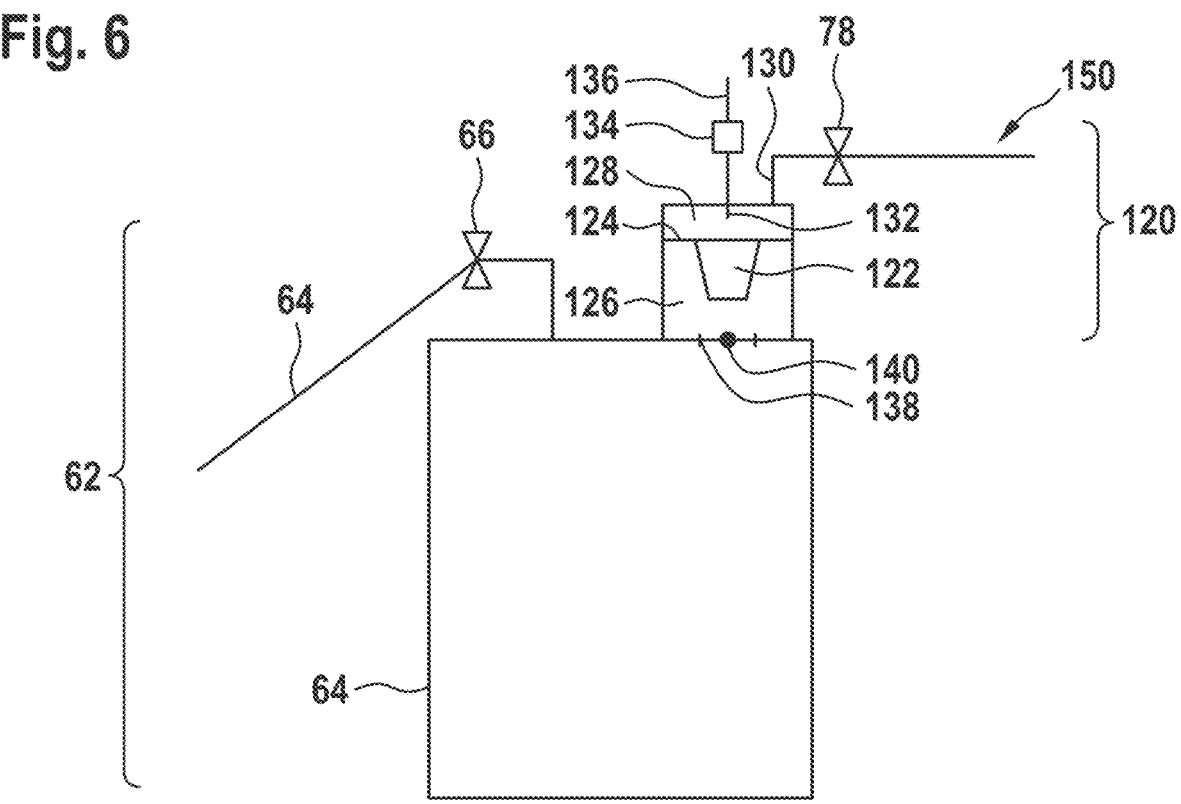
FIG. 6 shows a schematic representation of an exemplary discharge region, in particular a collecting container for solids-containing material.

FIG. 6 shows an embodiment of the waste gas outlet region 120 leading out of the collecting container 64. The waste gas outlet region 120 includes a filter unit 122 mounted on a partition 124. The filter unit 122 may include one or more filter elements. The partition 124 separates the waste gas outlet region 120 into a raw gas space 126 and a clean gas space 128. A mixture of solids-containing material (in particular of oxide-containing foreign objects, non-oxidized foreign objects, possibly filtration aids, other solids and agglomerates of such materials) and material in the fluid phase, in particular gaseous material (in particular excess oxidant, conveying fluid, purge fluid, cooling fluid, etc.) enters into the raw gas space 126. The filter unit 122 is configured to filter the mixture arriving in the raw gas space 126 to remove particulate oxidation residue and other particulate foreign material. A filtered mixture in the fluid phase is then present in the clean gas space 128 and is discharged through the waste gas outlet 130, which is located at the clean gas space 128. In particular, the mixture in the fluid phase is gaseous and is therefore referred to hereinafter in simplified form as waste gas. This waste gas can be discharged, for example, via the shut-off device 78 into the environment or to an external waste gas system. Alternatively, this waste gas can also be returned to the reaction region 24, for example to the oxidant inlet 36, as indicated in FIG. 6. It is conceivable to discharge a portion of the waste gas to the surroundings or to an external waste gas system and to return another portion of the waste gas to the reaction region 24, for example to the oxidant inlet 36. In this case, provisions may be made for controlling the ratio of the waste gas flow returned to the reaction region 24 to the waste gas flow discharged. In particular, this control can be arranged such that always only so much waste gas is returned into the circuit, in particular to the reaction region 24, that the fluid pressure (in particular the gas pressure) in the circuit system (in particular in the reaction region 24) does not exceed a predetermined upper limit value, in particular remains within a predetermined range.

In addition, a pressurized-gas cleaning-off unit associated with the filter unit 122 is arranged in the clean gas space 128, which is designed to generate pressure pulses acting on the filter element or elements for cleaning-off. The pressure pulses reach the clean gas space 128 via a pressurized-gas opening 132 from a pressurized-gas storage 134, and from there reach the filter element or elements of the filter unit 122. The pressurized-gas storage 134 can be filled with pressurized gas preferably via a pressurized-gas line 136. Pressurized-gas cleaning-off serves to clean off the filter unit 122 as soon as the filter performance of the filter unit 122 deteriorates. In that case, the pressurized gas is introduced into the clean gas space 128 in the form of pressurized-gas pulses, whereby filter element walls are subjected to pressure pulses and foreign objects that have accumulated on the raw gas side of the filter unit 122 are cleaned off from the filter unit 122. These foreign objects then fall from the waste gas outlet region 120 through a passage 136 into the collecting container 64. A shut-off member 140 is optionally arranged in the passage 138 to separate the discharge region 62 from the waste gas outlet region 120. It should be noted that it is not cogently necessary to equip the filter unit 122 with cleanable filter elements, and one could, for example, quite well use storage filters in the filter unit 122 that have to be replaced from time to time.

In order to achieve a recirculation of fluid, in particular of conveying fluid and/or unconsumed oxidant, it may be provided to connect the waste gas outlet 130 to the reaction region 24, in particular to the oxidant inlet 36, as schematically indicated in FIG. 2 as waste gas recirculation line 150. It is understood that the shut-off valve 78 in the waste gas recirculation line 150, as shown in FIGS. 2 and 6, is optional and that a waste gas recirculation line 150 without a shut-off valve is also possible. The recirculation creates a closed circuit, whereby inert fluid that was added to the previously described process for dry filtration as conveying fluid and/or purge fluid and/or heat dissipation fluid, can be recirculated in the process via the waste gas recirculation line 150 after passing through the process. In this way, considerable savings of required inert fluid can be achieved.

Since oxidant (in particular oxygen) is consumed as it passes through the process described for the oxidative treatment of filtration residues, it makes sense to add oxidant again to the fluid returned from the waste gas outlet 130 to the reaction region 24, in particular to the oxidant inlet 36, to the extent in which the oxidant has been consumed as it passes through the process. To this end, a sensor 142 may be provided in the waste gas recirculation line 150, for example between the waste gas outlet 130 and the oxidant inlet 36, to determine the depletion of oxidant in the fluid flow leaving the waste gas outlet 130 versus the desired concentration of oxidant in the oxidant flow entering the container 32 at the oxidant inlet 36. Furthermore, a device 144 may be provided for supplying oxidant to the recirculated fluid flow in accordance with the depletion of oxidant determined by the sensor 142.

In the example shown in FIG. 2, the sensor 142 is located at the oxidant inlet 36 and detects the actual concentration of oxidant in the oxidant flow as it enters the container 32 or the agglomerate collection region 33 of the reaction region 24. The device 144 for supplying oxidant to the recirculated fluid flow opens into the waste gas recirculation line 150 at a location upstream of the sensor 142 and is controlled such that the oxidant concentration sensed at the sensor 142 remains at a predetermined value or within a predetermined range about that predetermined value.

For example, the amount of fluid carried in the process can be kept constant by monitoring the fluid pressure in the recirculated fluid flow. For example, this can be accomplished by sensing and controlling or regulating the pressure at the waste gas outlet 136, at the oxidant inlet 36, or in the waste gas recirculation line 150. As indicated in FIG. 2, a pressure relief valve 146 can be arranged in the waste gas recirculation line 150 for this purpose, for example. With the aid of the pressure relief valve, a predetermined pressure can be set in the waste gas recirculation line 150 and thus ultimately the mass flow of fluid phase (i.e. the sum of oxidant and other fluids such as feed fluid, purge fluid, heat transfer fluid) in the circuit can be kept constant.

With an arrangement of the type described, it is possible to control or regulate both the mass flow of fluid carried in the circuit and the concentration of oxidant in this circuit in a simple manner. Thus, the strength of the oxidation reactions taking place during the treatment of filter residues can be controlled or regulated very elegantly in a closed control loop and adjusted in such a way that a sufficiently efficient oxidation of combustible material is achieved while not generating too much heat of reaction.

The invention claimed is:

1. A method for the dry filtration of a gas flow carrying foreign objects, in a filter device for cleaning off waste gas produced in additive manufacturing technologies, comprising:
conducting a raw gas flow containing foreign objects into a raw gas space of a filter unit which has at least one filter surface separating a raw gas side from a clean gas side; feeding oxidant to a reaction region located on the raw gas side of the filter surface downstream of the filter surface; such that foreign objects contained in material cleaned off from the filter surface and/or in the raw gas flow react in the reaction region with the oxidant to form oxide-containing foreign objects; wherein the reaction region is located downstream of the raw gas space with respect to the transport of foreign objects that have accumulated on the filter surface and have been cleaned off from the filter surface wherein oxide-containing foreign objects formed during the reaction and, if present, foreign objects not yet reacted are discharged via a pneumatic conveyor.

2. The method according to claim 1, wherein the pneumatic conveyor operates as a solids injector or a jet pump.

3. The method according to claim 1, wherein oxidant is supplied to the reaction region via an oxidant inlet and removed via an oxidant outlet; wherein the oxidant outlet is connected to the pneumatic conveyor.

4. The method according to claim 1, wherein oxidant not consumed during the reaction of material cleaned off from the filter surface with the oxidant is removed from the reaction region; wherein the oxidant outlet is different from the oxidant inlet; and/or wherein not consumed oxidant is discharged through the same oxidant outlet as oxide-containing foreign objects formed during the reaction and, if present, foreign objects not yet reacted.

5. The method according to claim 4, wherein the reaction region comprises regions located downstream of the oxidant outlet, downstream conduits, conveyors and/or containers.

6. The method according to claim 1, wherein the reaction region has a negative pressure applied thereto; wherein the application of negative pressure to the reaction region takes place during and/or following the reaction of material cleaned off from the filter surface with the oxidant; and/or during reaction of material cleaned off from the filter surface with the oxidant, oxidant that has not been consumed is withdrawn from the reaction region by the pneumatic conveyor.

7. The method according to claim 1, wherein the reaction region is supplied by an inert fluid by an inert gas; wherein the reaction of material cleaned off from the filter surface with the oxidant takes place in reaction phases and, following a respective reaction phase, the reaction region is acted upon by inert fluid without addition of oxidant; wherein inert fluid is fed into the reaction region via a further fluid inlet different from the oxidant inlet; and/or inert fluid and/or oxidant is discharged from the reaction region through a further outlet provided in addition to the oxidant outlet.

8. The method according to claim 1, wherein the reaction region has a heat transfer fluid flown therethrough for removing heat generated during the reaction of material cleaned off from the filter surface with the oxidant.

9. The method according to claim 1, wherein the reaction region includes an agglomerate collection region configured to receive material cleaned off from the filter surface, wherein foreign objects or agglomerates containing foreign objects, which have accumulated on the filter surface, are cleaned off and collected and stored in the agglomerate collection region; wherein a first closure means having a first shut-off member is associated with the agglomerate collection region, which closure means is designed such that it enables material falling from the filter surface during cleaning off to be collected in the agglomerate collection region and, after collecting the cleaned-off material in the agglomerate collection region, closes off the reaction region with respect to the raw gas space at least until the concentration of oxidant in the reaction region and/or in the agglomerate collection region has dropped to a sufficient extent.

10. The method according to claim 9, wherein material cleaned off from the filter surface is conveyed from the agglomerate collection region into a downstream discharge region, wherein the discharge region comprises at least a part of the reaction region; and oxidant is supplied to the agglomerate collection region and/or the discharge region; wherein the discharge region comprises a second closure means, wherein the reaction region is located between the first closure means and the second closure means; and/or wherein the discharge region comprises a collecting container for solids-containing material.

11. The method according to claim 1, wherein oxidant not consumed in the reaction region and, if present, further fluid accumulating as excess fluid after leaving the reaction region, is completely or partially recirculated to the reaction region; and/or wherein a control/regulation unit is provided which is arranged such that a fluid pressure within the reaction region does not exceed a predetermined upper limit value or remains within a predetermined pressure range.

12. A filter device for cleaning raw gas carrying foreign objects, comprising:
at least one filter element having at least one filter surface separating a raw gas side from a clean gas side in a raw gas space, to which a raw gas flow containing foreign objects can be supplied;
an oxidant supply adapted to supply an oxidant to a reaction region located on the raw gas side of the filter surface downstream of the filter surface; such that foreign objects contained in material cleaned off from the filter surface and/or the raw gas flow react with the oxidant in the reaction region to form oxide-containing foreign objects; wherein the reaction region is located downstream of the raw gas space with respect to the transport of foreign objects that have accumulated on the filter surface and have been cleaned off from the filter surface; wherein oxide-containing foreign objects formed during the reaction and, if present, foreign objects not yet reacted are discharged via a pneumatic conveyor.

13. The filter device according to claim 12, wherein the pneumatic conveyor operates as a solids injector or a jet pump.

14. The filter device according to claim 12, comprising an oxidant inlet arranged to supply oxidant into the reaction region and an oxidant outlet arranged to remove oxidant from the reaction region, wherein the oxidant outlet is connected to the pneumatic conveyor.

15. The filter device according to claim 14, wherein, during the reaction of material cleaned off from the filter surface with the oxidant, oxidant not consumed can be removed from the reaction region; wherein the oxidant outlet is different from the oxidant inlet; wherein the filter device is designed to discharge, unconsumed oxidant through the same oxidant outlet as oxide-containing foreign objects formed during the reaction and, if present, foreign objects that have not yet been reacted.

16. The filter device according to claim 15, wherein the reaction region comprises regions located downstream of the oxidant outlet, including downstream lines, conveyors and/or containers.

17. The filter device according to claim 12, which is arranged to apply a negative pressure to the reaction region, during and/or following the reaction of material cleaned off from the filter surface with the oxidant; and/or which is arranged to supply an inert fluid to the reaction region such as an inert gas; wherein the filter device comprises a controller programmed such that the reaction of material cleaned off from the filter surface with the oxidant takes place in reaction phases, wherein application of inert fluid to the reaction region without addition of oxidant is provided following a respective reaction phase.

18. The filter device according to claim 17, further comprising an additional fluid inlet into the reaction region, which is different from the oxidant inlet, for introducing inert fluid and/or heat transfer fluid; and/or, further comprising an additional outlet for discharging inert fluid and/or oxidant, which is provided in addition to the oxidant outlet.

19. The filter device according claim 12, wherein the reaction region includes an agglomerate collection region arranged to receive material cleaned off from the filter surface, wherein foreign objects or agglomerates containing foreign objects, which have accumulated on the filter surface, can be collected and stored in the agglomerate collection region after cleaning off thereof; wherein the agglomerate collection region has a first closure means associated therewith which has a first shut-off member and which is designed such that it enables material falling from the filter surface during cleaning off to be collected in the agglomerate collection region and, after collection of the cleaned-off material in the agglomerate collection region, closes off the reaction region with respect to the raw gas space at least until the concentration of oxidant in the reaction region has dropped to a sufficient extent; wherein the filter device further comprises a discharge region which is located downstream of the agglomerate collection region and into which material cleaned off from the filter surface can be conveyed, wherein the discharge region comprises at least a part of the reaction region, and oxidant can be supplied to the agglomerate collection region and/or the discharge region.

20. The filter device according to claim 19, wherein the discharge region comprises a second closure means, wherein the reaction region is located between the first closure means and the second closure means; wherein the discharge region comprises a collecting container for separating solids-containing material, wherein the collecting container has an outlet for fluid, gaseous material: wherein a filter unit for cleaning the fluid material from foreign objects is associated with the outlet; and wherein the filter device further comprises a fluid recirculation unit which is arranged such that oxidant not consumed in the reaction region and, if applicable, further fluid accumulating as excess fluid after leaving the reaction region, is completely or partially recirculated into the reaction region; wherein a control/regulation unit is provided which is arranged such that a fluid pressure within the reaction region does not exceed a predetermined value or remains within a predetermined range.

* * * * *